United States Patent Office 3,829,518
Patented Aug. 13, 1974

3,829,518
PROCESS FOR PRODUCTION OF POLYARYLENES
Arnold N. Wennerberg, Chicago, Ill., assignor to Standard Oil Company, Chicago, Ill.
No Drawing. Continuation-in-part of abandoned application Ser. No. 858,867, Sept. 17, 1969. This application June 21, 1972, Ser. No. 264,846
Int. Cl. C07c 15/12
U.S. Cl. 260—670                                30 Claims

ABSTRACT OF THE DISCLOSURE

Polyarylenes, i.e., polymers of aromatic compounds, can be produced by the dehydrogenative coupling of partially hydrogenated aromatics over a catalyst, in the presence of hydrogen, at elevated temperatures and pressures. The polyarylenes can also be produced from aromatic compounds by subjecting the aromatics to controlled partial hydrogenation as well as the dehydrogenative coupling. The polyarylenes produced by this process are soluble to an extent unknown heretofore in the art and possess thermal properties which renders them useful in high temperature applications such as ablative materials.

CROSS-REFERENCE

This application is a continuation-in-part of Ser. No. 858,867 filed on Sept. 17, 1969 by the same inventor, and now abandoned.

BACKGROUND OF THE INVENTION

Over the past decade or so, much effort has been expended on the synthesis and evaluation of polymers for high temperature use. The goal has been to extend the useful upper temperature limits at which polymers maintain their desirable properties to at least 300° C. and preferably to 500° C. or above. Polymers which possess these properties are usually highly aromatic structures, often with heterocyclic units, high melting, sometimes infusible, and usually with low solubility. This makes their fabrication very difficult and as a consequence limits their usefulness.

The high degree of thermal stability associated with the arylene bond in polyarylenes has been known for some time. Polyarylenes have generally been produced by such techniques as acid catalyzed oxidative coupling of the benzene ring in various aromatic compounds. An example of such a process is the Lewis acid catalyzed oxidative coupling process of Kovacic. In this process, aromatics such as benzene, biphenyl, and naphthalene are polymerized at moderate temperatures between about 0° C. and 100° C. in the presence of strong Lewis acid catalysts such as aluminum chloride and cupric chloride. The polyarylenes produced by these processes possess the desired thermal stability, but they are linear polymers which are relatively insoluble and infusible. In addition, these polymers generally contain residual chlorine from the chlorine based catalyst. The presence of this chlorine substantially interferes with the end properties of the polymer.

Other methods of producing polyarylenes are known which are aimed at producing soluble polymers. However, these methods generally require the presence of a meta monomer such as m-terphenyl or produce a substantial portion of insoluble polymer. Many of these types of polymers are also contaminated with chlorine impurities.

Applicant has discovered a novel process for the preparation of polyarylenes which are soluble in various aromatic solvents. In addition to the improved solubility, the polyarylenes produced by Applicant's process are free from the presence of chlorine and do not suffer from the other drawbacks described above. These polymers also possess outstanding thermal stability and are fusible.

SUMMARY OF THE INVENTION

This invention relates to the preparation of polyarylenes by the dehydrogenative coupling of partially hydrogenated aromatics. In this process, the partially hydrogenated aromatics are treated with a catalyst in the presence of hydrogen at a temperature above 750° F. and a pressure above 600 p.s.i.g. This invention also relates to a process for producing polyarylenes from aromatic compounds. In this aspect of the invention, the aromatics are additionally subjected to a controlled catalytic hydrogenation in the presence of hydrogen at a temperature of at least about 400° F. and a pressure of at least about 600 p.s.i.g. The polyarylenes can also be produced from a mixture of aromatics and partially hydrogenated aromatics by subjecting the mixture to both the hydrogenation and the dehydrogenative coupling steps.

DESCRIPTION OF THE INVENTION

This invention is a novel process for the preparation of polyarylenes. These polyarylenes are readily prepared by a one-step process starting with partially hydrogenated aromatics, by a two-step process starting with aromatics or a mixture of aromatics and partially hydrogenated aromatics, or by a combination of these processes. The one-step process consists of the catalytic dehydrogenative coupling of the partially hydrogenated aromatics in the presence of hydrogen at elevated temperatures and pressures. The two-step process consists of a controlled partial hydrogenation as well as the dehydrogenative coupling. The two-step process begins with either aromatic compounds or a mixture of aromatic compounds and partially hydrogenated aromatic compounds. Preferably, a mixture of aromatics with from about 1% to 10% of partially hydrogenated aromatics is employed. This two-step process of controlled hydrogenation and dehydrogenative coupling can be run as two separate steps or can be combined into one process during which the controlled hydrogenation and the dehydrogenative coupling can be occurring simultaneously.

The polyarylenes produced by the process of this invention are compositions which retain a high degree of thermal stability while possessing solubility in various aromatic solvents. The polyarylenes can be dissolved to different extents, depending on their molecular weight and structure, in solvents such as benzene, naphthalene, bromobenzene, and chlorobenzene. As the molecular weight of the polyarylenes increases, the halogenated aromatics are the preferred solvents. Polar compounds such as tetrahydrofuran and dimethylformamide can also be used as solvents. In general, the product polyarylenes are soluble over their full molecular weight range. In addition, the polyarylenes are completely free from impurities such as chlorine. The polymer is also fusible and can be thermally cross-linked.

Suitable starting materials or monomers for use in the practice of this invention are any of the aromatics containing a benzene ring structure or any of the partially hydrogenated aromatics containing a partially hydrogenated benzene ring structure. The partially hydrogenated aromatic compounds must be hydrogenated to at least their dihydro derivative but must not be fully hydrogenated. The monomers must have at least two unsubstituted positions for the subsequent coupling reactions. By unsubstituted, I mean that these positions contain no substituents other than hydrogen atoms. However, the above aromatic compounds and partially hydrogenated aromatic compounds may contain substituents such as alkyl groups containing from 1 to 3 carbon atoms.

Specific examples of aromatic compounds which can be polymerized by the process of this invention are benzene, biphenyl, toluene, xylene, ethylbenzene, naphthalene, mesitylene, anthracene, and the like. Examples of partially hydrogenated aromatic compounds which can be utilized in the process of this invention are the hydrophenyls such as cyclohexadiene and cyclohexane, the hydrobiphenyls such as phenyl cyclohexadiene, phenyl cyclohexene, and phenyl cyclohexane, the hydrotoluenes, and hydroxylenes, the hydronaphthalenes, the hydroanthracenes, and the like. While either the aromatic compounds or the partially hydrogenated aromatic compounds may be reacted alone, a mixture of aromatics and partially hydrogenated aromatics may be employed. In a preferred process when an aromatic compound is employed as a starting material, it may be mixed with from about 1% to 10%, more preferably 1% to 5%, of a partially hydrogenated aromatic.

The catalysts useful in the process of this invention are such as the noble metal catalysts, alkalized chromium trioxide on alumina or silica, alkalized ferric oxide on alumina or silica, nickel and molybdenum oxides on alumina or silica, sodium, calcium, cobalt, or molybdenum oxides on alumina or silica, or mixtures thereof, and the like. Other catalysts useful in this invention include sodium hydroxide on magnesium silicate, sodium hydride on alumina or silica, sodium hydride and cobalt oxide on alumina or silica, and the like. A preferred catalyst is a mixture of calcium, cobalt, and molybdenum oxides on alumina. Another preferred catalyst is a mixture of sodium oxide, cobalt oxide, and molybdenum oxide on alumina.

The amount of catalyst necessary for use in the process of this invention will vary with the materials being polymerized and the reaction conditions in terms of time, temperature and pressure. If an insufficient amount of catalyst is used for a particular reaction system under any set of reaction conditions, reaction rates will be decreased. If excess catalyst is used, conversion will be decreased and coke formation will occur. For most reaction systems at least about 1% by weight catalyst, based on the monomer weight, is used with about 2% to about 4% by weight being preferred.

Optimum time, pressure, and temperature conditions for the process of this invention cannot be given since such will depend upon the nature of the particular compounds being polymerized as well as the particular catalyst system being employed. For example, condensed ring compounds, such as naphthalene are in general more reactive than single ring compounds such as biphenyl and the reactions may be carried out under milder conditions with the former.

However, we have ascertained certain advantageous reaction conditions. In a one-step process starting with the partially hydrogenated aromatics, temperatures within the range of 750° F. to about 1300° F., preferably about 900° F. to 1200° F., and pressures within the range of 600 p.s.i.g. to 2000 p.s.i.g., preferably 1000 p.s.i.g. to 1700 p.s.i.g., more preferably 1200 p.s.i.g. to 1600 p.s.i.g., have been found useful.

In a two-step process starting with the aromatics or a mixture of aromatics and partially hydrogenated aromatics, whe have found that temperatures within the range of 400° F. to 1200° F., preferably 750° F. to 1100° F., and pressures within the range of 500 p.s.i.g. to 2000 p.s.i.g., preferably 800 p.s.i.g. to 1500 p.s.i.g., are useful in the hydrogenation step. In the dehydrogenation step, we have found temperatures within the range of 800° F to 1300° F., preferably 900° F. to 1200° F., and pressures within the range of 600 p.s.i.g. to 2000 p.s.i.g., preferably 1000 p.s.i.g. to 1700 p.s.i.g., to be particularly useful.

Both the controlled hydrogenation and the dehydrogenative coupling steps need to be conducted in the presence of hydrogen. The hydrogen partial pressure should be at least about 10% of the total pressure at reaction conditions. Preferably the hydrogen partial pressure is from about 30% to 60% and the total reaction pressure at reaction conditions. More preferable, the partial hydrogen pressure is about half of the total pressure. In general, if the process of this invention is carried out in an autoclave reactor, the initial charge of hydrogen gas at room temperature should be at least about 50 p.s.i.g. and preferably between about 200 p.s.i.g. and 400 p.s.i.g.

The presence of an inert solvent is not necessary during either the hydrogenation or the dehydrogenative coupling steps. However, with some monomers, it may be desirable to conduct the polymerization reaction in a hydrocarbon solvent which tends to remain relatively inert under the conditions of the reaction.

In a preferred method of operation, the steps of controlled hydrogenation and dehydrogenative coupling can be combined into one process. In this process, aromatic compounds or a mixture of aromatics with partially hydrogenated aromatics are charged to a sealed, stirred reactor along with a suitable catalyst and sufficient hydrogen gas. The reactor is then heated to an elevated temperature, generally under constant heat input conditions. In the early stages of the reaction, after the initial heat up period, the temperature tends to increase at a very gradual rate. After a period of time, generally a number of hours, the temperature begins to increase at a more rapid rate. After a further time, the temperature generally reaches a peak and begins to decrease somewhat. After another interval of time, the temperature tends to level off at a value which is measurably lower than the peak temperature. Thus, the reaction temperature increases rapidly during initial heat up, basically levels off for a time, and then goes through a noticeable temperature increase followed by a noticeable decrease in temperature. Finally, the temperature levels off again.

In this preferred process, the temperature reached after initial heat up is generally within the range of 400° F. to about 1100° F., preferably about 800° F. to 1000° F. The peak reaction temperature is generally within the range of 900° F. to about 1300° F., preferably 1000° F. to 1200° F. The pressures reached after the initial heat up are generally within the range of 600 p.s.i.g. to 1200 p.s.i.g., although higher pressures are possible. The maximum pressure is generally within the range of 1000 p.s.i.g. to 2000 ps.i.g., preferably 1200 p.s.i.g. of 1700 p.s.i.g. The partial hydrogen pressure is as described above.

While not wishing to be bound by any theory, the following is offered as an explanation of this observed behavior. The partial hydrogenation of the starting materials in this process is exothermic. The dehydrogenative coupling of the partially hydrogenated aromatics is endothermic. After the initial heat up period, during the period of gradual temperature increase, it is believed that some hydrogenation is occurring along with possibly a small amount of dehydrogenative coupling. During the period at which the temperature is found to be increasing more rapidly, the system is believed to have begun to react in substantial proportion in terms of the partial hydrogenation. It is also believed that some dehydrogenative coupling is occurring during this time. After the temperature has reached its peak point, the rate of dehydrogenative coupling is believed to be significantly greater than the rate of partial hydrogenation. When the temperature levels off again after having reached a peak temperature, the dehydrogenative coupling is considered to be complete for all practical purposes.

It should be kept in mind that the above-described temperature behavior does not always occur. With some monomers and catalyst systems, the decreasing temperature stage is not observed. However, polymer is still being produced.

Example I

The practice of this invention for the production of a polyarylene from biphenyl in a two-stage flow process can be carried out as follows:

Into a 500 ml. rocking bomb reactor there was charged 10.0 g. of a catalyst having the composition $$10CaO \cdot CoO \cdot MoO_3 \cdot 8Al_2O_3$$

with 60 g. (0.39 mol) biphenyl and hydrogen sufficient to produce a partial pressure at 750° F. in the range of 800 to 1000 p.s.i.g. A hydrogenation reaction for production of intermediate hydrobiphenyls was carried out for 3 hours at a temperature in the range of 650° F. to 750° F. under a total pressure of 1500 p.s.i.g. representing a hydrogen partial pressure of 800 to 1000 p.s.i.g. Following such reaction, the system was cooled to room temperature and unreacted hydrogen was voided to reduce reactor pressure to 50 p.s.i.g. A dehydrogenation reaction resulting in dehydrogenative coupling was next performed over a period of 6 hours at a temperature of 1000° F. and a pressure of 750 to 800 p.s.i.g. During this reaction hydrogen was vented at intervals to maintain the reactor pressure at the 750 to 800 p.s.i.g. level and remove hydrogen produced by the dehydrogenation reaction. Following the reaction the reactor was cooled to room temperature and all hydrogen was vented.

The total crude reaction product amounted to 69 g. of material which was viscous liquid at 80° C. This was transferred to a 500 ml. beaker and dissolved in 250 ml. of benzene. Some residual material was removed from the reactor by benzene washing and the total crude product solution was filtered to separate solid catalyst. Following filtration, the clear filtrate was flashed for removal of 210 ml. of benzene yielding a viscous solution at 25° C. To the solution there was added 500 ml. of n-pentane. The pentane solution was stirred for 3 hours following which an insoluble fraction was separated by filtration and washed with 350 ml. portions of pentane. The filtrate and washes were combined and the pentane was removed by distillation to yield 49.3 g. of a pentane-soluble product. The pentane insoluble product amounted to 12.8 g. of a solid which was determined by infra-red analysis and gel permeation chromatography to contain terphenyl, quatraphenyl, pentaphenyl and hexaphenyl in addition to the higher molecular weight branched phenylenes. The conversion to polyphenylenes of biphenyl was approximately 21.4%.

Example II

This example demonstrates the preparation of a polyarylene from a mixture of an aromatic, biphenyl, and a partially hydrogenated aromatic, phenylcyclohexane.

Into a stirred 300 ml. autoclave there was charged 2.0 g. of catalyst having the composition $$10CaO \cdot CoO \cdot MoO_3 \cdot 8Al_2O_3$$

100 g. (0.65 mol) of biphenyl, 4.8 g. (0.03 mol) of phenylcyclohexane (a hydrobiphenyl) and hydrogen sufficient to produce a pressure of 300 p.s.i.g. at the reaction temperature. The autoclave was maintained at a temperature within the range of 1000 to 1060° F. for a period of about 12 hours under a total pressure of 600 to 1000 p.s.i.g. with a hydrogen partial pressure of 300 p.s.i.g. The autoclave contents were cooled and worked up according to the general procedure in Example I, following which there was obtained a pentane-insoluble polyphenylene having a number average molecular weight of about 1000 which was completely soluble in benzene.

Example III

In a similar fashion, a polynaphthalene can be prepared from naphthalene.

Into a 300 ml. stirred autoclave there was charged 100 g. (0.78 mol) naphthalene, 2.0 g. of catalyst having the composition $10CaO \cdot CoO \cdot MoO_3 \cdot 8 Al_2O_3$ and hydrogen. The autoclave was maintained at a temperature of 970 to 1000° F. for about 12 hours under a total pressure of 1000 to 1200 p.s.i.g. representing a hydrogen partial pressure of 200 p.s.i.g. There was obtained 55.0 g. of a benzene-soluble polynaphthalene having a number average molecular weight of about 1000 and being insoluble in pentane. This represented a 55% yield.

Example IV

Into a stirred 300 ml. autoclave there was charged 16 g. of catalyst along with 50 g. of benzene and 50 p.s.i.g. of hydrogen. A maximum pressure of 1040 p.s.i.g. and a maximum temperature of 1058° F. was reached during a 7 hour reaction period. The percent conversion to soluble polymer was 5%. The polymer had a number average molecular weight of 1000.

Example V

Into a stirred 300 ml. autoclave there was charged 2.0 g. of the catalyst of Example I along with 47.5 g. of toluene and 2.5 g. of phenylcyclohexane. The initial hydrogen charge was 200 p.s.i.g. The reaction time was 6 hours, the total pressure was 1600 p.s.i.g. and the maximum temperature was 1050° F. The percent conversion to polymer soluble in benzene was about 20%.

Example VI

Into a stirred 300 ml. autoclave there was charged 2.0 g. of catalyst, $CaO \cdot CoO \cdot MoO_3 \cdot Al_2O_3$, with a weight composition of 50:1:4.5:44.5, 97.5 g. of biphenyl, 2.5 g. of phenylcyclohexane and 300 p.s.i.g. of hydrogen gas. The maximum temperature reached was 940° F. and the total pressure was as high as 1260 p.s.i.g. The reaction time was 59 hours.

The total crude product was transferred to a 1000 ml. beaker and dissolved in 500 ml. of 1,2,4-trichlorobenzene with the help of heat and stirring. After filtration to remove the catalyst, the filtrate was transferred into a 4000 ml. flask and the polymer was precipitated out with n-pentane. The polymer was filtered and washed with n-pentane. The polymer was then dried in a vacuum over at 100° C. for 24 hours. The conversion to polymer soluble in trichlorobenzene was 45.5%. The polymer had a number average molecular weight of about 5400.

Example VII

In a manner similar to that described in Example 6, there was charged 1 g. of a catalyst $$Na_2O \cdot CoO \cdot MoO_3 \cdot Al_2O_3$$

with a weight composition of 0.07:3.5:13:83.4 along with the same monomer and hydrogen charge. The reaction was completed in 56 hours, generated a total pressure of 1250 p.s.i.g., and reached a maximum temperature of 985° F. The polymer was worked up in a manner similar to Example 6. The conversion to soluble polymer was 44.0%. The polymer had a number average molecular weight of approximately 9600.

Example VIII

In a manner similar to Example 6, there was charged to the reactor 2.0 g. of a catalyst, $NaH \cdot CoO \cdot Al_2O_3$ with a weight ratio of 2:1:97, and the same monomer and hydrogen charge used in Example 6. The reaction was completed in 7 hours, generated a total pressure of 1400 p.s.i.g., and reached a maximum temperature of 1110° F. The percent conversion to soluble polymer was 27.5% with a number average molecular weight of 1700.

Example IX

In a manner similar to Example 6, 2.0 g. of 30% sodium hydroxide on magnesium silicate was charged to the reactor along with the same monomer and hydrogen charge. The reaction ran for 7 hours, reached a maximum temperature of 1135° F., and generated a total pressure of 1880 p.s.i.g. The percent conversion to trichlorobenzene soluble polymer was 6.8% with a number average molecular weight of 1000.

As indicated above, the polyarylenes produced by the process of this invention possess properties which make them useful in many applications requiring high temperature thermal stability. Some of the applications for this polymer are use in ablative materials, carbon fiber composites, and grease and lubricating oils.

What I claim is:

1. A dehydrogenative coupling process for the polymerization of partially hydrogenated aromatic hydrocarbons which comprises treating partially hydrogenated aromatic hydrocarbons with a catalyst, at a temperature above 750° F. at a pressure above 600 p.s.i.g., in the presence of hydrogen.

2. The process of Claim 1 wherein the temperature is between 750° F. and 1300° F. and the pressure is between 600 p.s.i.g. and 2000 p.s.i.g.

3. The process of Claim 2 wherein the temperature is between 900° F. and 1200° F.

4. The process of Claim 2 wherein the pressure is between 1000 p.s.i.g. and 1700 p.s.i.g.

5. The process of Claim 2 wherein the partially hydrogenated aromatic hydrocarbon is a member of the group consisting of a partially hydrogenated benzene, a partially hydrogenated biphenyl, a partially hydrogenated naphthalene, and alkylated hydrocarbon derivatives thereof.

6. The process of Claim 2 wherein the catalyst is selected from the group consisting of alkalized chromium trioxide, alkalized ferric oxide, sodium oxide, calcium oxide, cobalt oxide, molybdenum oxide, and mixtures thereof.

7. The process of Claim 2 wherein the catalyst is a composite of sodium or calcium oxide, cobalt oxide, and molybdenum oxide supported on alumina.

8. The process of Claim 2 wherein the partial hydrogen pressure under reaction conditions is at least 30% of the total reaction pressure.

9. A process for the polymerization of aromatic hydrocarbons or a mixture of aromatic hydrocarbons and partially hydrogenated aromatic hydrocarbons which comprises the controlled partial hydrogenation of the aromatic hydrocarbons or the mixture of aromatic hydrocarbons and partially hydrogenated aromatic hydrocarbons with a catalyst, in the presence of hydrogen, at a temperature of at least 400° F., and at a pressure of at least 500 p.s.i.g., followed by the dehydrogenative coupling with a catalyst, at a temperature above 750° F., at a pressure above 600 p.s.i.g., and in the presence of hydrogen.

10. The process of Claim 9 wherein the controlled partial hydrogenation occurs at a temperature between 400° F. and 1200° F. and at a pressure between 500 p.s.i.g. and 2000 p.s.i.g., and the dehydrogenative coupling occurs at a temperature between 750° F. and 1300° F. and a pressure between 600 p.s.i.g. and 2000 p.s.i.g.

11. The process of Claim 10 wherein the controlled partial hydrogenation takes place at a temperature between 750° F. and 1100° F.

12. The process of Claim 10 wherein the controlled partial hydrogenation takes place at a pressure between 800 p.s.i.g. and 1500 p.s.i.g.

13. The process of Claim 10 wherein the aromatic hydrocarbon is selected from the group consisting of benzene, biphenyl, toluene, xylene, and naphthalene.

14. The process of Claim 10 wherein the partially hydrogenated aromatic hydrocarbon is a member of the group consisting of a partially hydrogenated benzene, a partially hydrogenated biphenyl, a partially hydrogenated naphthalene, and alkylated hydrocarbon derivatives thereof.

15. The process of Claim 10 wherein the aromatic hydrocarbon is biphenyl.

16. The process of Claim 10 wherein the aromatic hydrocarbon is biphenyl and the partially hydrogenated aromatic hydrocarbon is a phenylcyclohexane.

17. The process of Claim 10 wherein the aromatic hydrocarbon is naphthalene.

18. The process of Claim 10 wherein the catalyst is selected from the group consisting of alkalized chromium trioxide, alkalized ferric oxide, sodium oxide, calcium oxide, cobalt oxide, molybdenum oxide, and mixtures thereof.

19. The process of Claim 10 wherein the catalyst is a composite of sodium or calcium oxide, cobalt oxide, and molybdenum oxide supported on alumina.

20. The process of Claim 10 wherein the partial hydrogen pressure is at least 30% of the total reaction pressure.

21. A process for the polymerization of aromatic hydrocarbons or a mixture of aromatic hydrocarbons and partially hydrogenated aromatic hydrocarbons which comprises reacting the aromatic hydrocarbons or the mixture of aromatic hydrocarbons and partially hydrogenated aromatic hydrocarbons with a catalyst, at a temperature between 400° F. and 1300° F., at a pressure between 600 p.s.i.g. and 2000 p.s.i.g., in the presence of hydrogen.

22. The process of Claim 21 wherein the temperature is between 800° F. and 1200° F.

23. The process of Claim 21 wherein the aromatic hydrocarbon is selected from the group consisting of benzene, biphenyl, toluene, xylene, and naphthalene.

24. The process of Claim 21 wherein the partially hydrogenated aromatic is a member of the group consisting of a partially hydrogenated benzene, a partially hydrogenated biphenyl, a partially hydrogenated naphthalene, and alkylated hydrocarbon derivatives thereof.

25. The process of Claim 21 wherein the aromatic hydrocarbon is biphenyl.

26. The process of Claim 21 wherein the aromatic hydrocarbon is biphenyl and the partial hydrogenated aromatic hydrocarbon is a phenylcyclohexane.

27. The process of Claim 21 wherein the aromatic hydrocarbon is naphthalene.

28. The process of Claim 21 wherein the catalyst is selected from the group consisting of alkalized chromium trioxide, alkalized ferric oxide, sodium oxide, calcium oxide, cobalt oxide, molybdenum oxide, and mixtures thereof.

29. The process of Claim 21 wherein the catalyst is a composite of sodium or calcium oxide, cobalt oxide, and molybdenum oxide supported on alumina.

30. The process of Claim 21 wherein the partial hydrogen pressure is at least 30% of the total reaction pressure.

References Cited

UNITED STATES PATENTS

| | | | |
|---|---|---|---|
| 1,996,738 | 4/1935 | Drossbach et al. | 260—670 |
| 1,996,739 | 4/1935 | Drossbach et al. | 260—670 |
| 3,228,994 | 1/1966 | Robinson | 260—670 |
| 3,359,340 | 12/1967 | Hand | 260—670 |
| 3,367,986 | 2/1968 | De Vries | 260—670 |

OTHER REFERENCES

Kovacic et al.: J. Org. Chem, 30 (9) 3176–81, 1965.

C. R. DAVIS, Primary Examiner

U.S. Cl. X.R.

260—668 R, 668 D